(12) United States Patent
Kataoka et al.

(10) Patent No.: US 7,760,592 B2
(45) Date of Patent: Jul. 20, 2010

(54) OPTICAL DISK APPARATUS WITH AN IMPROVED TRACK JUMP PERFORMANCE

(75) Inventors: Takeyoshi Kataoka, Yokohama (JP); Motoyuki Suzuki, Yokohama (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 632 days.

(21) Appl. No.: 11/503,104

(22) Filed: Aug. 11, 2006

(65) Prior Publication Data

US 2007/0115772 A1 May 24, 2007

(30) Foreign Application Priority Data

Nov. 21, 2005 (JP) ............... 2005-335125

(51) Int. Cl.
*G11B 7/00* (2006.01)
(52) U.S. Cl. .................. 369/44.28; 369/53.28
(58) Field of Classification Search ........... None
See application file for complete search history.

(56) References Cited

U.S. PATENT DOCUMENTS 5,648,947 A * 7/1997 Hamaguchi et al. ...... 369/44.28
6,628,580 B1 * 9/2003 Kishimoto et al. ....... 369/44.28
2004/0141429 A1 * 7/2004 Kishimoto et al. ....... 369/30.14

FOREIGN PATENT DOCUMENTS

| JP | 05-205287 | 8/1993 |
|----|-----------|--------|
| JP | 2004-335105 | 11/2004 |
| JP | 2004-342314 | 12/2004 |

* cited by examiner

*Primary Examiner*—Paul Huber
(74) *Attorney, Agent, or Firm*—Townsend and Townsend and Crew LLP (57) ABSTRACT

An optical disk device for recording or reproducing an optical disk has: an objective lens for irradiating a laser beam to the optical disk; an actuator for moving the objective lens in the radial direction of the optical disk; and a spindle motor for rotating the optical disk. After the laser beam irradiated to the optical disk passed through a PID portion of the optical disk, the actuator moves the objective lens in the radial direction of the optical disk at a timing corresponding to a rotational speed. Between signals to drive the actuator, an output time of a deceleration signal is set to a predetermined ratio of a time during which an acceleration signal is outputted. While the deceleration signal is outputted, a light spot passes through the PID portion.

18 Claims, 7 Drawing Sheets

FIG.4A  MOTION OF LIGHT SPOT

FIG.4B  TRACKING ERROR SIGNAL

TRACKING DRIVE SIGNAL

OPTICAL DISK APPARATUS WITH AN IMPROVED TRACK JUMP PERFORMANCE

INCORPORATION BY REFERENCE

The present application claims priority from Japanese application JP2005-335125 filed on Nov. 21, 2005, the content of which is hereby incorporated by reference into this application.

BACKGROUND OF THE INVENTION

The invention relates to an optical disk apparatus having an optical pickup and, more particularly, to a track jump on an optical disk.

There has been proposed a track jump method whereby when an abnormality has occurred in a track jump of an optical disk, a scanning position of the track is stored and a track jump command is outputted at the timing when the track jump does not overlap at such a position (refer to JP-A-5-205287).

By using such a method, when a rotational speed of the optical disk is equal to a low-times speed (low×speed), the track jump can be executed so as not to overlap a PID portion.

SUMMARY OF THE INVENTION

In the related art of JP-A-5-205287 mentioned above, nothing is considered with respect to the case where the rotational speed is set to a high-times speed (high×speed) and it cannot be avoided that the PID portion enters during the track jump.

When the realization of higher-times speed of a DVD-RAM progresses, since the track jump cannot be executed within one sector (between the PID and the PID) any longer, the track jump has to be executed over two sectors.

This is because although it takes a time of about 200 to 300 μsec for the track jump, a time which is required until a laser beam passes through the next PID after passing through the PID is equal to about 300 μsec for a 5-times speed and the laser beam passes through the PID during the track jump when a recording speed or a reproducing speed exceeds the 5-times speed.

Figures 2A, 2B:
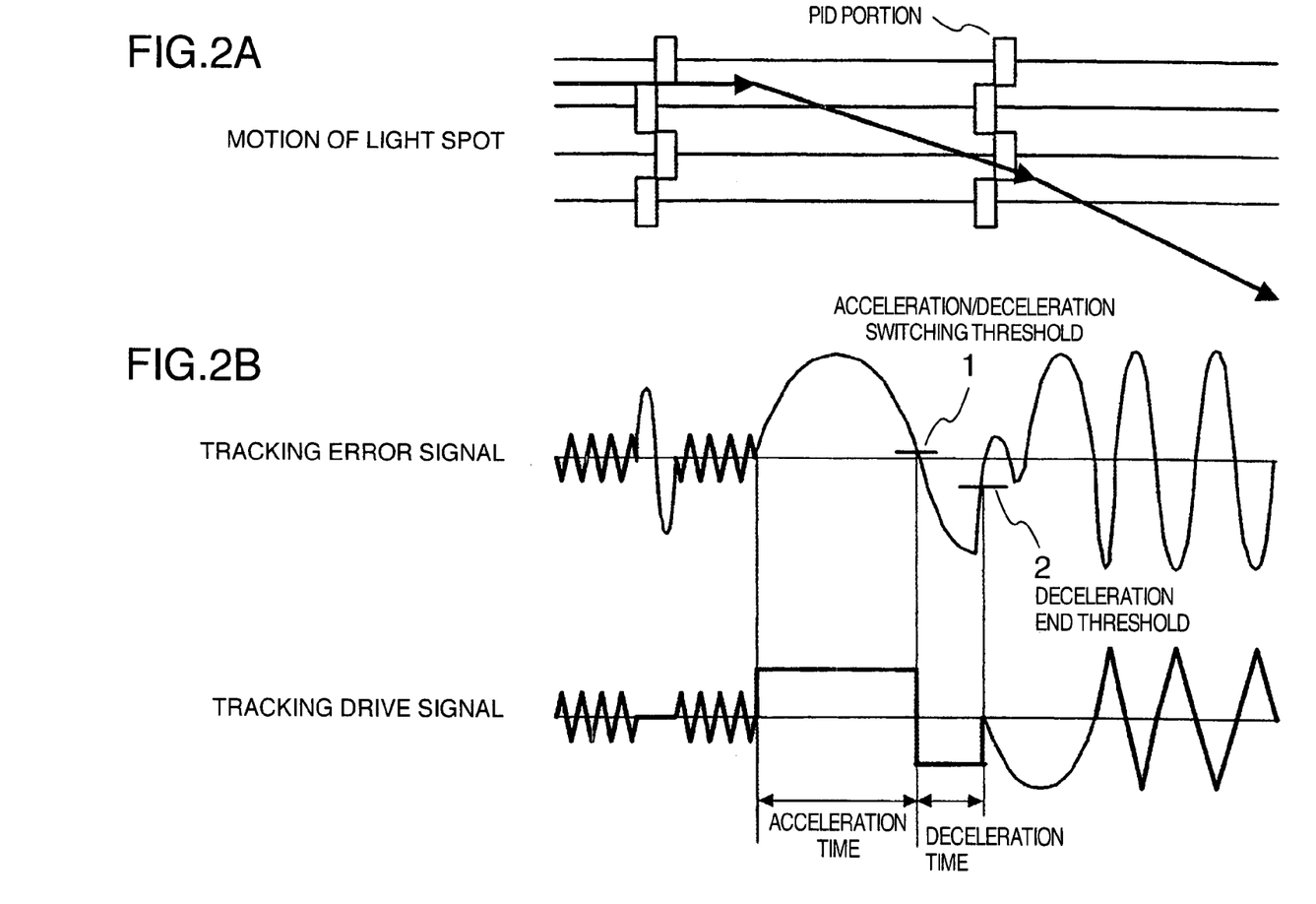
FIGS. 2A and 2B are explanatory diagrams of the operation when the track jump fails.

As shown in FIGS. 2A and 2B, if the light spot passes through the PID before a deceleration end threshold, timing to finish a deceleration voltage is erroneously set, making a deceleration insufficient, and the light spot cannot be pulled in to a target track, so that there is a fear that the track jump fails and the reproducing operation or the recording operation of the disk fails.

It is, therefore, an object of the invention to solve the foregoing problems and provide an optical disk apparatus having high reliability.

To accomplish the above object, according to one aspect of the invention, there is provided an optical disk apparatus for recording and reproducing information to/from an optical disk, comprising: an optical pickup having a semiconductor laser for emitting a laser beam to be irradiated onto the optical disk, an objective lens, an actuator, and a photodetector for detecting reflection light from the optical disk; a spindle motor unit for rotating the optical disk; error signal forming means for forming a tracking error signal representing a relative position in the radial direction between the objective lens and a track of the optical disk from an output signal of the photodetector; actuator driving means for driving the actuator; spindle motor driving means for driving the spindle motor; and system control means for obtaining the tracking error signal from the error signal forming means, outputting a tracking drive signal to the actuator driving means, and outputting a spindle drive signal to the spindle motor driving means, wherein when the actuator performs a track jump, after the laser beam irradiated to the optical disk passed through a PID of the optical disk, an acceleration signal is outputted from the system control means so as to move the objective lens in the radial direction of the optical disk at a timing according to a rotational speed of the optical disk, the signal is switched from an acceleration to a deceleration on the basis of the tracking error signal, and a deceleration time is set to a time of a certain predetermined ratio of the acceleration time, so that even if the laser beam transverses the PID during the output of a deceleration signal and the tracking error signal is disturbed, the track jump can be performed without being influenced by the disturbed tracking error signal.

Just before the laser beam passes through the PID of the optical disk, the system control means adjusts the timing and outputs the acceleration signal. While the light spot is transversing the PID, the system control means ignores the tracking error signal. After the laser beam transversed the PID, the system control means switches the signal from the acceleration to the deceleration on the basis of the tracking error signal and allows the deceleration signal to be outputted only for the deceleration time corresponding to the certain predetermined ratio of the acceleration time. Thus, even if the light spot transverses the PID again during the deceleration, the track jump is not influenced by it.

According to the invention, the optical disk apparatus with the high reliability in which the track jump can be stably performed can be provided.

Other objects, features and advantages of the invention will become apparent from the following description of the embodiments of the invention taken in conjunction with the accompanying drawings.

DESCRIPTION OF THE EMBODIMENTS

An embodiment of the invention will be described hereinbelow with reference to the drawings. Similar component elements in the drawings are designated by the same reference numerals.

As an optical disk apparatus of the invention, any one of a read only apparatus, a recording only apparatus, and a recording and reproducing may be used so long as it can discriminate an optical disk.

There has been developed an optical disk apparatus corresponding to a DVD-RAM disk in which data is recorded onto an optical disk having grooves and lands of a predetermined length disposed spirally or concentrically for recording data and having a plurality of sectors each of which is constructed by a header portion consisting of address data and a data area in which the data is recorded, or the data recorded on the optical disk is reproduced, and a PID (Physical ID) as address data of the header portion has been alternately formed for the groove and for the land.

Figure 1A:
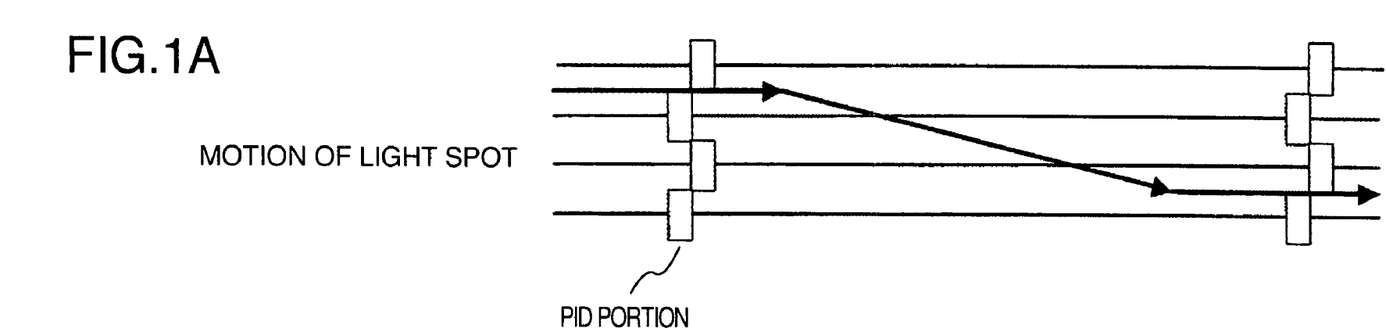
FIGS. 1A and 1B are explanatory diagrams of the fundamental operation of a track jump.
Figure 1B:
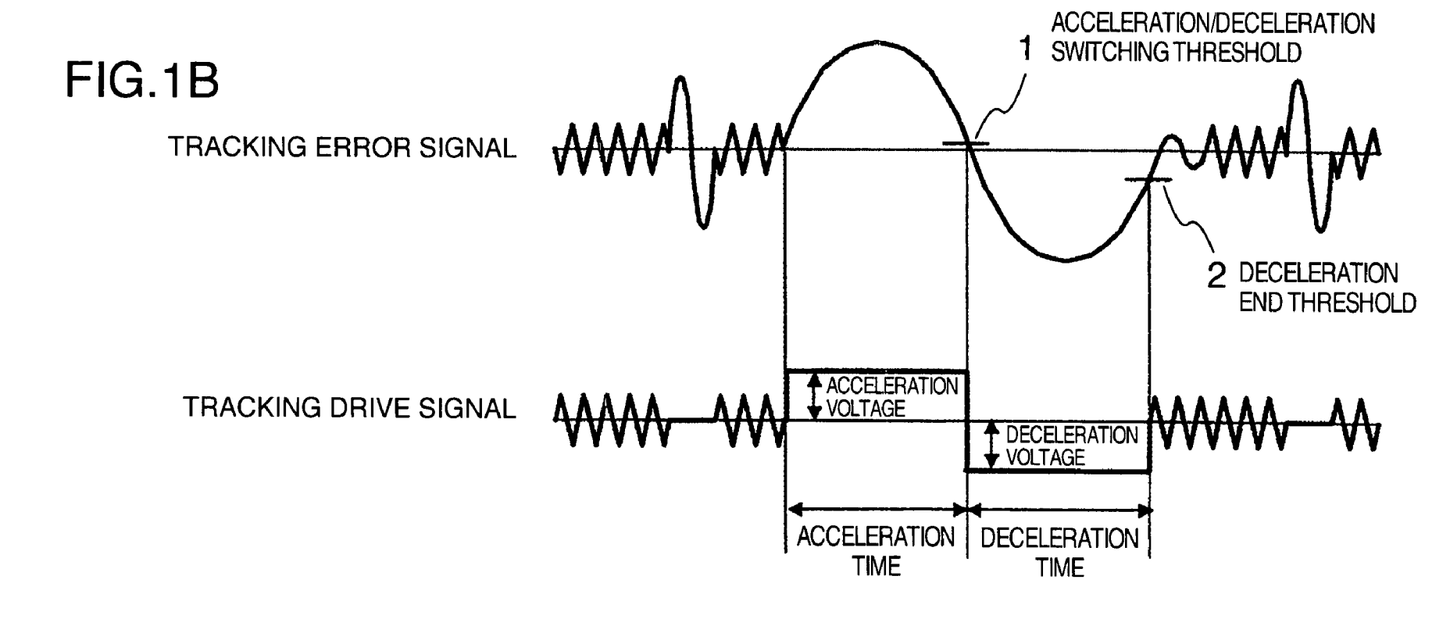

In the optical disk apparatus, a track jump to move a light spot to an adjacent track is controlled by using a tracking error signal. As shown in FIGS. 1A and 1B, although a waveform of the tracking error signal changes in accordance with the movement of the light spot between the tracks, in the control of the track jump, it is particularly important to control an acceleration voltage and a deceleration voltage in accordance with timing when the light spot passes through a boundary between the tracks. This is because the track jump is realized by switching the acceleration voltage to the deceleration voltage at the timing when the tracking error signal transverses an acceleration/deceleration switching threshold, finishing the supply of the deceleration voltage at the timing when the tracking error signal transverses a deceleration end threshold, and switching a control mode to a normal feedback control.

However, in a DVD-RAM driving apparatus or the like, when the light spot transverses the PID at the time of the track jump, the tracking error signal is caused to change and the switching between the acceleration and the deceleration by a tracking drive signal is not normally performed. Therefore, it is necessary to perform the track jump so that the light spot do not transverse the PID.

Embodiment 1

Figure 3:
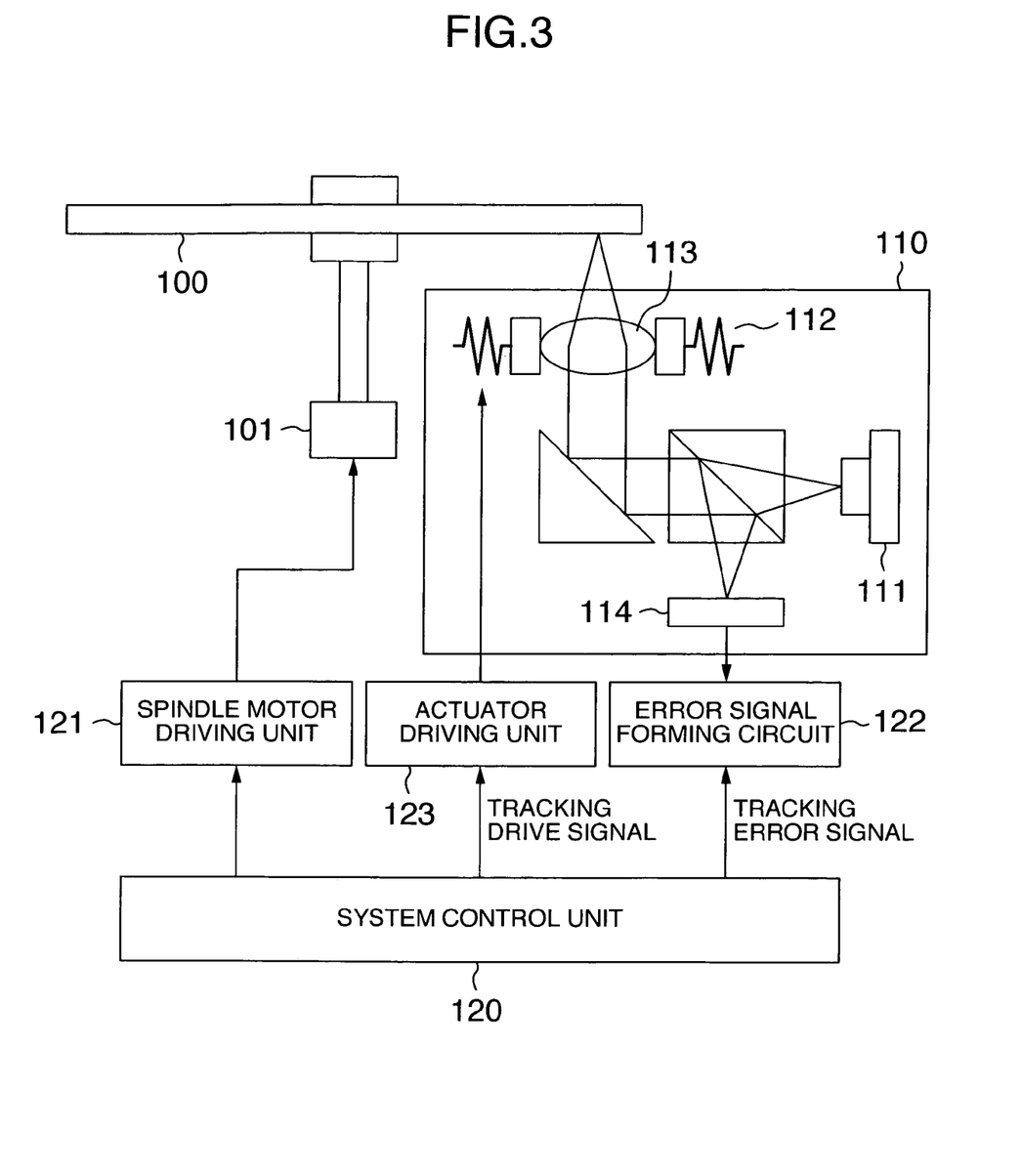
FIG. 3 shows an optical disk apparatus.

FIG. 3 is a block diagram showing a construction of an optical disk apparatus according to the invention.

Reading, erasure, and writing of information of the optical disk 100 are executed to/from an optical disk 100 by irradiating a laser beam from an optical pickup 110. The optical disk 100 is rotated by a spindle motor 101 which is driven by a spindle motor driving unit 121 which received a signal from a system control unit 120.

The laser beam emitted from a semiconductor laser 111 is converged onto an information recording surface of the optical disk 100 by an objective lens 113 which is moved in the radial direction of the optical disk 100 by an actuator 112, reflected, and detected by a photodetector 114. A tracking error signal formed by an error signal forming unit 122 from the signal detected by the photodetector 114 is inputted to the system control unit 120. An actuator driving unit 123 drives the actuator 112 by a tracking drive signal which is outputted from the system control unit on the basis of information of the tracking error signal, thereby moving the objective lens 113 in the radial direction of the optical disk 100.

Figure 4A:
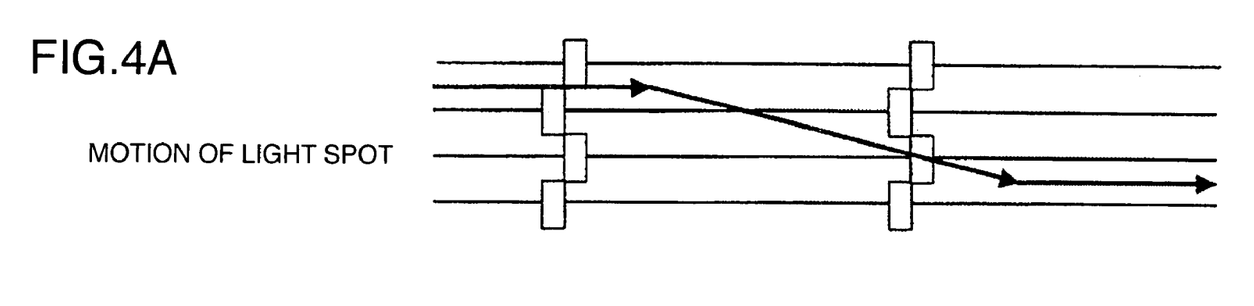
FIGS. 4A and 4B are explanatory diagrams of the track jump operation.
Figure 4B:
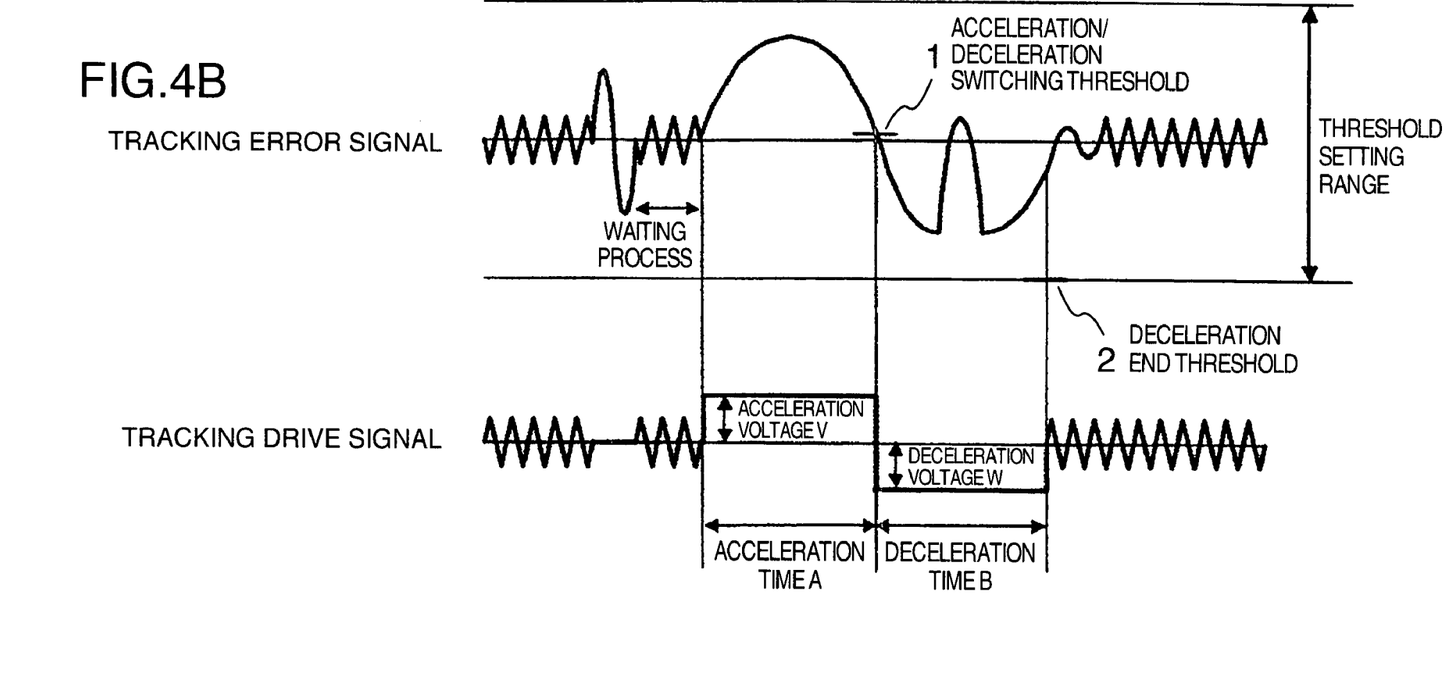

FIGS. 4A and 4B show a motion of the light spot at the time of the track jump and the tracking error signal and the tracking drive signal according to the invention. After the system control unit 120 outputs the acceleration voltage to the tracking drive signal, while detecting the tracking error signal, it moves the actuator in the jumping direction, measures an acceleration time A which is required until the tracking error signal transverses an acceleration/deceleration switching threshold, does not set the deceleration end threshold, but outputs the deceleration voltage only for a deceleration time B corresponding to a certain predetermined ratio of the acceleration time A. Assuming that such a ratio is denoted as α, the deceleration time B is expressed by the following equation.

$$B = \alpha \times A$$

By virtue of this, even if the light spot transverses the PID during the deceleration, the deceleration can be performed for a predetermined time within the acceleration time A without being influenced by the transversing. Although the deceleration end threshold is not set in the above explanation, a similar effect is obtained even if the deceleration end threshold is set to a level which is equal to or larger than an amplitude of the tracking error signal.

By setting a waiting process after the passage through the PID, the timing to start the track jump is adjusted. The time for the waiting process is set in such a manner that the light spot does not transverse the PID during the acceleration but the light spot transverses the PID almost at the center of the deceleration time in order to cope with a variation. In the DVD-RAM, since the number of PIDs gets larger as a position approaches an outer rim (periphery) closer, assuming that a rotating system of the disk is the constant angular velocity (hereinafter, abbreviated to "CAV"), a time interval between the PIDs in an inner rim portion of the disk differs from that in an outer rim portion. It is preferable to set a waiting time every zone in order to cope with such a problem.

By outputting the acceleration signal and the deceleration signal by a method similar to that mentioned above, the invention can be also applied to a half-track jump from the land to the groove or from the groove to the land.

Embodiment 2

Figure 5A:
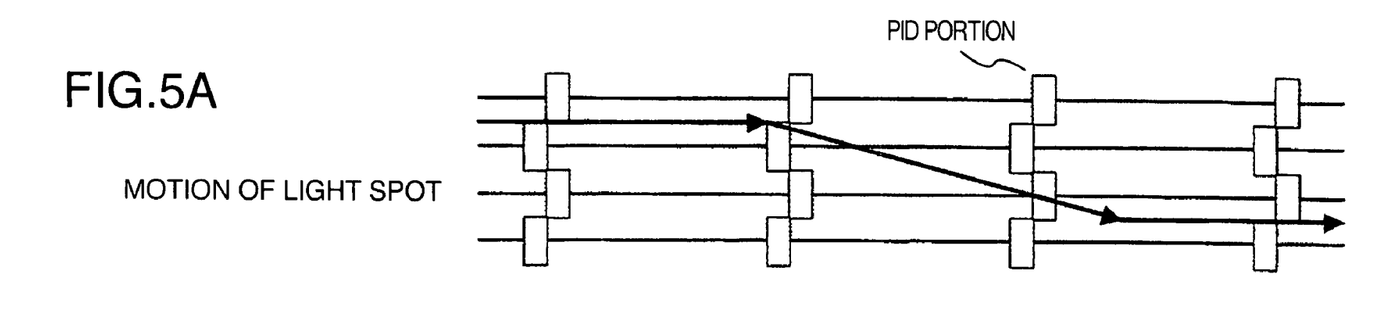
FIGS. 5A and 5B are explanatory diagrams of the track jump operation.
Figure 5B:
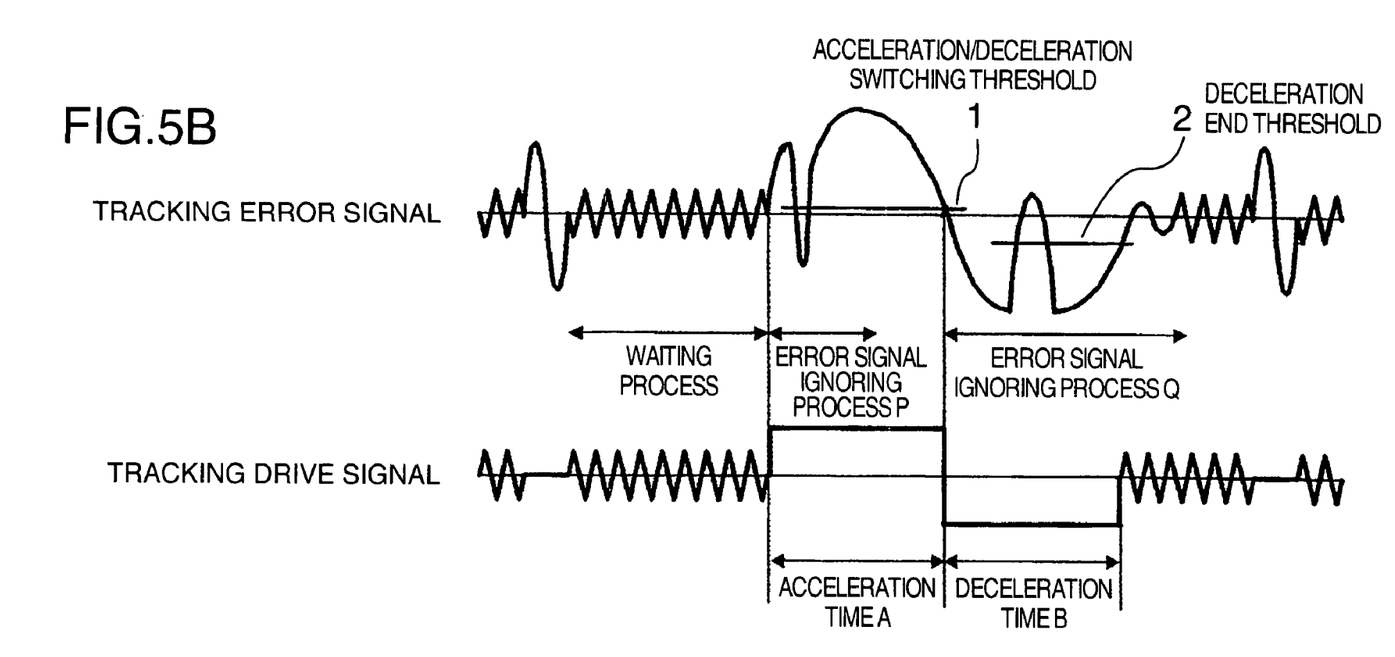

FIGS. 5A and 5B show the motion of the light spot at the time of the track jump and the tracking error signal and the tracking drive signal according to the invention with respect to the case where an appearance frequency of the PIDs is shorter than that in the case of the embodiment 1 and it is difficult to cope with such a situation by the method of the embodiment 1. A construction of an optical disk apparatus of the embodiment 2 is substantially the same as that in the embodiment 1.

In a manner similar to the embodiment 1, it is assumed that the deceleration time B is equal to a certain predetermined ratio of the acceleration time A. The system control unit 120 sets the time for the waiting process so that the light spot transverses the PID immediately after the start of the acceleration.

Even if the tracking error signal transverses the acceleration/deceleration switching threshold together with the start of the acceleration, the system control unit 120 inserts an error signal ignoring process P for ignoring such a situation, thereafter, detects the tracking error signal, and detects that the tracking error signal transverses the acceleration/deceleration switching threshold. A time for the error signal ignoring process P is set to a time which is required until the light spot transverses the PID and until the timing before the tracking error signal transverses the acceleration/deceleration switching threshold.

The system control unit 120 inserts an error signal ignoring process Q after the tracking driving voltage is switched to the deceleration. Even if the tracking error signal transverses the deceleration end threshold, it is ignored, thereby allowing the deceleration voltage to be outputted for the deceleration time B corresponding to only a certain predetermined ratio of the acceleration time A. A time for the error signal ignoring process Q is set to be long enough to sufficiently cover the deceleration time B.

By combining the embodiments 1 and 2, it is possible to use a method whereby in the inner rim portion and the middle portion of the optical disk 100 which is rotated at the CAV, the track jump is performed by the method of the embodiment 1, while in an outer rim portion, the track jump is performed by the method of the embodiment 2.

Embodiment 3

Figure 6A:
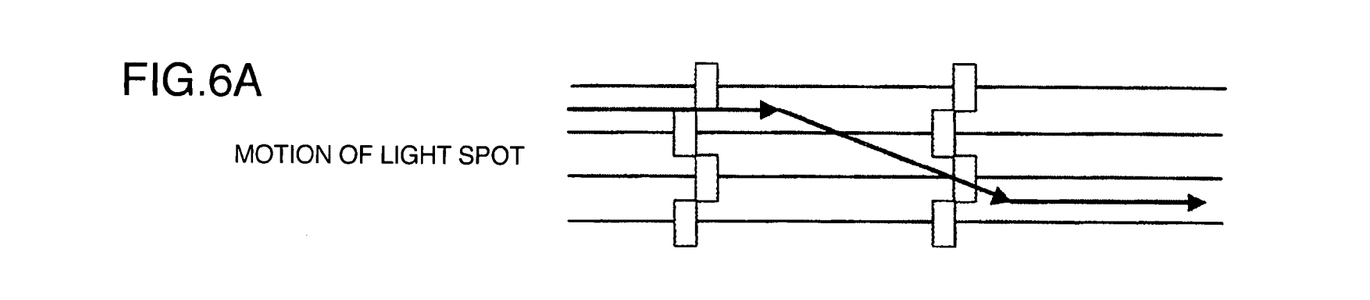
FIGS. 6A and 6B are explanatory diagrams of the track jump operation.
Figure 6B:
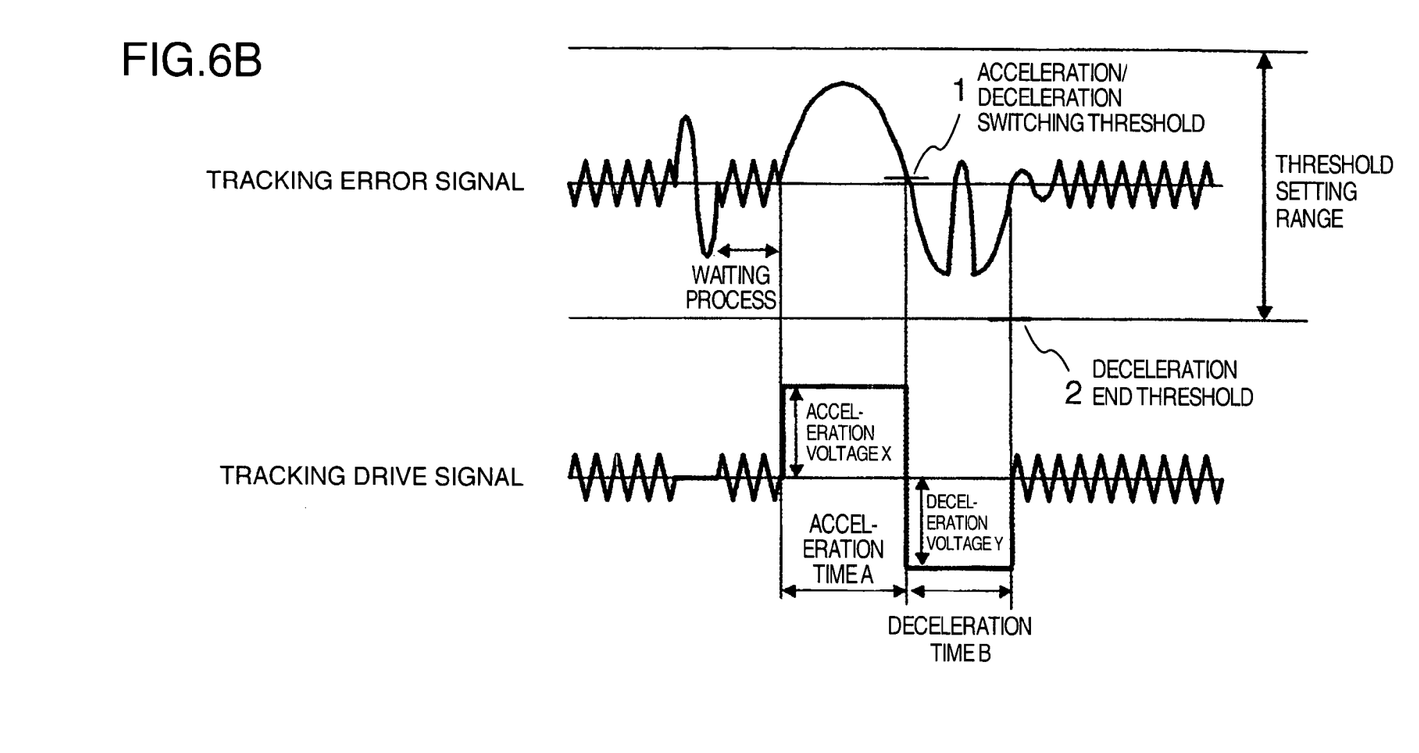

FIGS. 6A and 6B show the motion of the light spot at the time of the track jump and the tracking error signal and the tracking drive signal according to the invention with respect to the case where an appearance frequency of the PIDs is shorter than that in the case of the embodiment 1 and it is impossible to cope with such a situation by the method of the embodiment 1. A construction of an optical disk apparatus of the embodiment 3 is substantially the same as that in the embodiment 1.

In the embodiment 3, an acceleration voltage X and a deceleration voltage Y are set to be higher than an acceleration voltage V and a deceleration voltage W in the embodiment 1. Therefore, a moving speed of the objective lens 113 is raised and a moving time can be shortened.

By using the method of the embodiment 3, the time which has been set for the optical disk 100 every zone in the embodiments 1 and 2 can be used for different rotational speeds. That is, even if the rotational speeds differ, by changing the voltage levels of the acceleration and the deceleration, it is possible to cope with such a situation by one waiting time for one zone. Therefore, if the waiting time has been preset every zone into a memory or the like of the optical disk apparatus, it is sufficient merely to change the voltage in accordance with the rotational speed. There is no need to prepare a parameter table of the waiting times every rotational speed.

Embodiment 4

The embodiment 4 shows a method whereby the time which has been set for the optical disk 100 every zone in the embodiments 1 and 2 is used for the different rotational speeds. A construction of an optical disk apparatus of the embodiment 4 is substantially the same as that in the embodiment 1.

In both of the embodiments 1 and 2, the acceleration voltage and the deceleration voltage are constant irrespective of the zones and the waiting time is set every zone. When the rotational speeds differ, the time which is necessary for the light spot to transverse the PID varies. Therefore, it is necessary to set the table of the waiting time every rotational speed to which the optical disk apparatus corresponds.

To this end, the table of the waiting time is made to be adapted to a plurality of rotational speeds by changing the voltage level like an embodiment 3. The embodiment 4 shows a method whereby when the optical disk 100 is inserted into the optical disk apparatus, by adjusting the voltage level, the table of the waiting time is made to be adapted to a plurality of rotational speeds.

Figure 7:
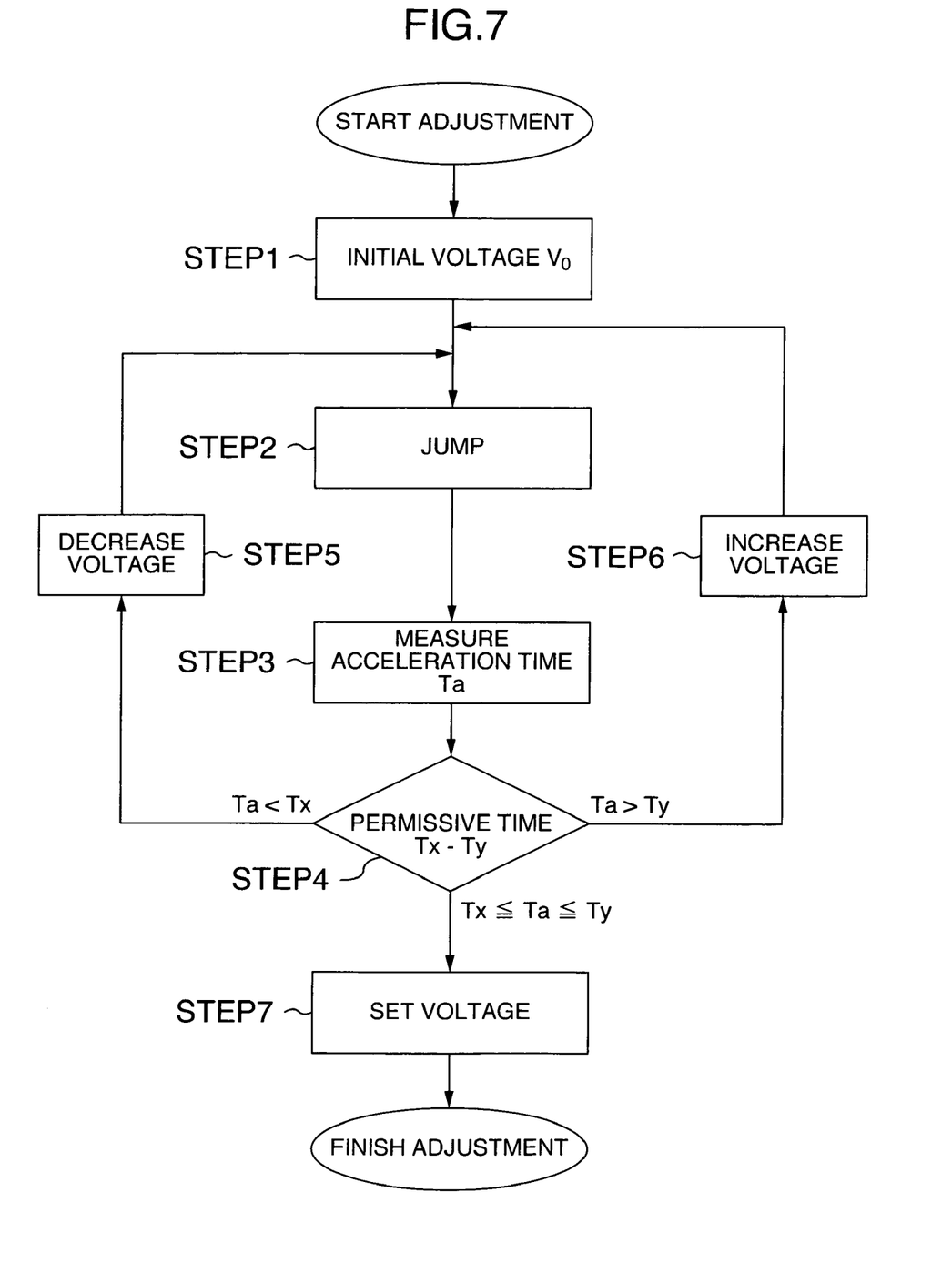
FIG. 7 is a flowchart.

An adjusting method of the voltage level will be explained with reference to a flowchart of FIG. 7.

In step 1, both of the acceleration voltage and the deceleration voltage are set to an initial voltage level $V_0$. The initial voltage level has previously been stored in the optical disk apparatus.

In step 2, the track jump is performed. At this time, although the track jump may be performed in any zone, since the number of PIDs is smaller as the position approaches the inner rim portion closer, it is desirable to perform the track jump in the inner rim portion.

In step 3, a time Ta required for the acceleration of the track jump is measured. Proper times corresponding to the time which is required for the acceleration suitable for the rotational speed have previously been stored in the optical disk apparatus. Such times are now assumed to be a permissive time $T_x - T_y$ ($T_x < T_y$).

In step 4, whether or not the measured acceleration time $T_a$ lies within the permissive time $T_x - T_y$ is discriminated.

If $T_a < T_x$ as a discrimination result of step 4, since the voltage level is too large, the voltage level is decreased in step 5 and, thereafter, the processing routine is returned to step 3.

If $T_a > T_y$ as a discrimination result of step 4, since the voltage level is too small, the voltage level is increased in step 6 and, thereafter, the processing routine is returned to step 3.

If $T_x \leq T_a \leq T_y$ as a discrimination result of step 4, the voltage level is determined to be proper and the voltage is set to this level in step 7.

By using the method of the embodiment 4, unlike the embodiment 3, it is possible to cope with a variation in sensitivity of the actuator. Even if characteristics of the actuator differ depending on a difference of temperature situations, the voltage level according to such a situation can be set.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disk apparatus for reproducing information from or recording information to an optical disk, comprising:
    an objective lens which forms a light spot onto a data recording film of said optical disk;
    an actuator which moves said objective lens in a radial direction of said optical disk, and a photodetector which detects reflection light from said optical disk;
    an error signal forming portion which forms a tracking error signal from a signal which is outputted from said photodetector;
    a controller which outputs a tracking drive signal on the basis of said tracking error signal; and
    an actuator driver which drives said actuator on the basis of an actuator control signal which is outputted from said controller,
    wherein an acceleration signal and a deceleration signal which are outputted from said controller to said actuator driver in order to move said objective lens in the radial direction,
    wherein the length of said acceleration signal output time and deceleration signal output time varies in accordance with a period from when said acceleration signal is outputted until said tracking error signal reaches a predetermined value after coming through a local maximum value or a local minimum value,
    wherein said deceleration signal output time varies in direct relation with said acceleration signal output time such that said deceleration signal output time becomes shorter as said acceleration signal output time becomes shorter and said deceleration signal output time becomes longer as said acceleration signal output time becomes longer.

2. A device according to claim 1, wherein when said objective lens is moved in the radial direction, the light spot does not pass through an address information recording portion showing an address of said optical disk, while said controller is outputting the acceleration signal, wherein said optical disk is a DVD-RAM disk and said address information recording portion is a PID (Physical ID).

3. A device according to claim 1, wherein timing to start the movement of said objective lens is set every zone of said optical disk.

4. A device according to claim 1, wherein a timing to start the movement of said objective lens is set by an address of said optical disk.

5. A device according to claim 1, wherein a timing to start the movement of said objective lens is set in accordance with a rotational speed of a spindle motor.

6. A device according to claim 1, wherein the movement of said objective lens in the radial direction includes a half-track jump in which the light spot formed on the optical disk is moved from a groove to a land adjacent thereto or is moved from the land to the groove or a full-track jump in which the light spot is moved from the groove to the groove which is closest thereto or is moved from the land to the land which is closest thereto.

7. A device according to claim 1, wherein a voltage level of the acceleration signal is set so that the output time of said acceleration signal is set to a predetermined time.

8. A device according to claim 7, wherein a track jump which is executed to adjust the voltage level is performed in an inner half region of a radius of said optical disk.

9. An optical disk apparatus for reproducing information from or recording information to an optical disk, comprising:
an optical pickup having an objective lens which converges a laser beam and forming a light spot onto a data recording film of said optical disk, an actuator which moves said objective lens in a radial direction of said optical-disk, and a photodetector which detects reflection light from said optical disk;
a spindle motor which rotates said optical disk;
spindle motor driver which drives said spindle motor;
error signal forming means which forms a tracking error signal from a signal which is outputted from said photodetector;
a system control unit which outputs a tracking drive signal on the basis of said tracking error signal; and
an actuator driver which drives said actuator on the basis of an actuator control signal which is outputted from said system control unit,
wherein an acceleration signal and a deceleration signal which are outputted from said system control unit to said actuator driving means in order to move said objective lens in the radial direction, are such that an output time of said acceleration signal is determined on the basis of the tracking error signal, and an output time of said deceleration signal is set to a predetermined ratio of the output time of the acceleration signal,
wherein when said objective lens is moved in the radial direction, the light spot does not pass through an address information recording portion showing an address of said optical disk, while said system control unit is outputting the acceleration signal,
wherein when said objective lens is moved in the radial direction, said acceleration signal is started to be outputted at such a timing that the light spot passes through said address information recording portion, while said system control unit is outputting the deceleration signal.

10. A device according to claim 9, wherein said optical disk is a DVD-RAM disk and said address information recording portion is a PID (Physical ID).

11. An optical disk apparatus for reproducing information from or recording information to an optical disk, comprising:
an optical pickup having an objective lens which converges a laser beam and forming a light spot onto a data recording film of said optical disk, an actuator which moves said objective lens in a radial direction of said optical disk, and a photodetector which detects reflection light from said optical disk;
a spindle motor which rotates said optical disk;
spindle motor driver which drives said spindle motor;
error signal forming means which forms a tracking error signal from a signal which is outputted from said photodetector;
a system control unit which outputs a tracking drive signal on the basis of said tracking error signal; and
an actuator driver which drives said actuator on the basis of an actuator control signal which is outputted from said system control unit,
wherein an acceleration signal and a deceleration signal which are outputted from said system control unit to said actuator driving means in order to move said objective lens in the radial direction, are such that an output time of said acceleration signal is determined on the basis of the tracking error signal, and an output time of said deceleration signal is set to a predetermined ratio of the output time of the acceleration signal,
wherein when said objective lens is moved in the radial direction, said apparatus is set so that said system control unit is not influenced by changes in the tracking error signal for a predetermined time after said system control unit starts to output said acceleration signal and that the objective lens is started to move at such a timing that the light spot passes through an address information recording portion which shows an address of said optical disk during said predetermined time.

12. A device according to claim 11, wherein said optical disk is a DVD-RAM disk and said address information recording portion is a PID (Physical ID).

13. An optical disk apparatus for reproducing information from or recording information to an optical disk, comprising:
an optical pickup having an objective lens which converges a laser beam and forming a light spot onto a data recording film of said optical disk, an actuator which moves said objective lens in a radial direction of said optical disk, and a photodetector which detects reflection light from said optical disk;
a spindle motor which rotates said optical disk;
spindle motor driver which drives said spindle motor;
error signal forming means which forms a tracking error signal from a signal which is outputted from said photodetector;
a system control unit which outputs a tracking drive signal on the basis of said tracking error signal; and
an actuator driver which drives said actuator on the basis of an actuator control signal which is outputted from said system control unit,
wherein an acceleration signal and a deceleration signal which are outputted from said system control unit to said actuator driving means in order to move said objective lens in the radial direction, are such that an output time of said acceleration signal is determined on the basis of the tracking error signal, and an output time of said deceleration signal is set to a predetermined ratio of the output time of the acceleration signal,
wherein timing to start the movement of said objective lens is set every zone of said optical disk,
wherein a time table showing the timing to start the movement of said objective lens which is set every zone has previously been recorded in a memory or the like of the optical disk device.

14. A device according to claim 13, wherein amplitudes of the acceleration signal and the deceleration signal are changed in correspondence to a rotational speed or a variation in characteristics of said actuator so that said timing table recorded in the memory or the like of the optical disk device can be applied.

15. An optical disk apparatus for reproducing information from or recording information to an optical disk, comprising:
   an objective lens which forms a light spot onto a data recording film of said optical disk;
   an actuator which moves said objective lens in a radial direction of said optical disk, and a photodetector which detects reflection light from said optical disk;
   an error signal forming portion which forms a tracking error signal from a signal which is outputted from said photodetector;
   a controller which outputs a tracking drive signal on the basis of said tracking error signal; and
   an actuator driver which drives said actuator on the basis of an actuator control signal which is outputted from said controller,
   wherein when a track jump is to be executed which moves said objective lens in the radial direction of said optical disk, a predetermined waiting time elapses after said light spot has passed through an address information recording portion before start of an acceleration signal for track jumping so that said light spot passes through two other address information recording portions, wherein said light spot passes through one of said two other address information recording portions after acceleration signal output time starts and, wherein said light spot passes through the other of said two other address information recording portions during deceleration of said signal output time.

16. The apparatus according to claim 15, wherein when executing a track jumping, said waiting time is so set that said acceleration signal is started to be outputted at such a timing that said light spot passes through an address information recording portion while said controller is outputting a deceleration signal for said actuator.

17. The apparatus according to claim 16, wherein when executing a track jumping, said waiting time is so set that said track jumping is executed at such a timing that said light spot passes through an address information recording portion within a predetermined time after said controller starts to output an acceleration signal for said actuator.

18. The apparatus according to claim 15, wherein said optical disk is divided into a plurality of zones in the radial direction and a setting of said waiting time is changed for every zone according to a data transfer rate in the zone.

* * * * *